United States Patent

Denz et al.

[11] Patent Number: 5,606,509
[45] Date of Patent: Feb. 25, 1997

[54] CORRECTION OF A MEASURING SIGNAL OBTAINED FROM A PAIR OF SCANNING ROLLERS AND PERTAINING TO THE THICKNESS OF A TEXTILE FIBER SLIVER

[75] Inventors: Peter Denz, Hohenwart; Roland Mandl; Karl Wisspeintner, both of Ortenburg, all of Germany

[73] Assignee: Rieter Ingolstadt Spinnereimaschinenbau AG, Ingolstadt, Germany

[21] Appl. No.: 635,534

[22] Filed: Apr. 22, 1996

Related U.S. Application Data

[63] Continuation of Ser. No. 408,547, Mar. 21, 1995, abandoned.

[30] Foreign Application Priority Data

Apr. 29, 1994 [DE] Germany .............. 44 14 972.7

[51] Int. Cl.⁶ .................................................. G01B 5/06
[52] U.S. Cl. ............... 364/470.14; 364/496; 364/176; 364/563; 364/575
[58] Field of Search .................. 364/176, 468, 364/472, 556, 563, 571.01, 571.02, 571.04, 571.05, 575; 73/25

[56] References Cited

U.S. PATENT DOCUMENTS

| | | |
|---|---|---|
| 4,126,027 | 11/1978 | Smith, Jr. et al. .......... 72/11 |
| 4,137,487 | 1/1979 | Niestroj et al. ............. 318/39 |
| 4,653,153 | 3/1987 | Felix et al. . |
| 4,691,547 | 9/1987 | Teoh et al. . |
| 5,010,494 | 8/1991 | Lord . |
| 5,181,408 | 1/1993 | Yeh et al. ............ 364/571.02 |

FOREIGN PATENT DOCUMENTS

| | | |
|---|---|---|
| 0176661B1 | 1/1992 | European Pat. Off. . |
| 842849 | 5/1952 | Germany . |
| 2140639 | 2/1972 | Germany . |
| 2214138 | 10/1972 | Germany . |
| 2551153 | 5/1977 | Germany . |
| 2650287C2 | 5/1978 | Germany . |
| 4012551C1 | 6/1991 | Germany . |
| 1188509 | 10/1985 | U.S.S.R. . |
| 1360608 | 7/1974 | United Kingdom . |
| 1425826 | 2/1976 | United Kingdom . |
| 2036102 | 6/1980 | United Kingdom . |

OTHER PUBLICATIONS

European Search Report.
IBM Technical Disclosure Bulletin; vol. 18, No. 7, Dec. 1975, Variable Size Exit Tray.
Patents Abstracts of Japan, M–246, Sep. 30, 1983, vol. 7/No. 221.

*Primary Examiner*—Ellis B. Ramirez
*Assistant Examiner*—Craig Steven Miller
*Attorney, Agent, or Firm*—Dority & Manning

[57] ABSTRACT

The invention relates to the correction of an error-prone measuring signal of a pair of scanning rollers. The measuring signal is influenced by the circularity error of the pair of scanning rollers and/or by the eccentric mounting of the pair of scanning rollers. The pair of scanning rollers is used to measure the thickness of a fiber fleece or fiber sliver on a pre-spinning machine in the textile industry. The occurrence of a periodic error value in the measuring signal due to circularity error and/or eccentricity of the pair of scanning rollers is detected. The error value is stored in a position-related manner for one revolution of the scanning rollers and the stored error value is used in the operation of the scanning rollers within the cycles of rotation for the correction of the current, position-synchronous measuring signals.

9 Claims, 3 Drawing Sheets

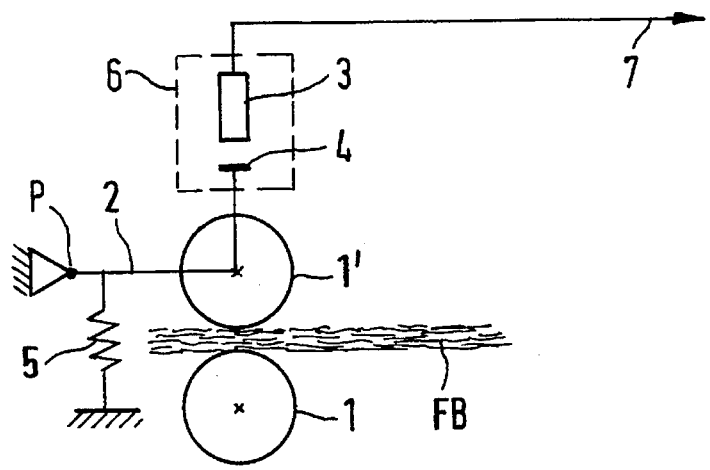
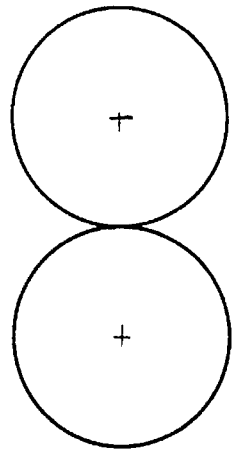
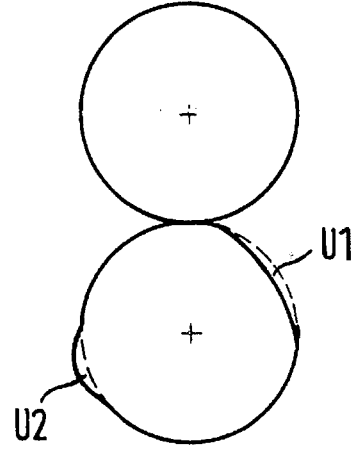
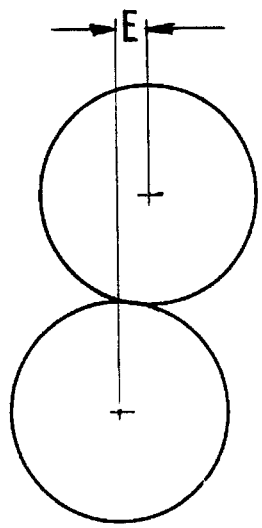

CORRECTION OF A MEASURING SIGNAL OBTAINED FROM A PAIR OF SCANNING ROLLERS AND PERTAINING TO THE THICKNESS OF A TEXTILE FIBER SLIVER

This is a continuation of application Ser. No. 08/408,547, filed Mar. 21, 1995, which was abandoned upon the filing hereof.

BACKGROUND OF THE INVENTION

The instant invention relates to the correction of an error-prone measuring signal of a pair of scanning rollers which is used to measure the thickness of a fiber fleece or fiber sliver on a pre-spinning machine in the textile industry. The measuring signal is influenced by the circularity error of the pair of scanning rollers and/or by the eccentric mounting of the pair of scanning rollers.

The thickness of a fiber fleece or of a fiber sliver is measured by means of a pair of scanning rollers. For the sake of simplification, only a fiber sliver is mentioned hereinafter even though all statements made concerning the scanning roller also apply to measuring the thickness of a fiber fleece. A representative signal, the measuring signal, is derived from the measured thickness. The measuring signal is conveyed to a signal processing device. The signal processor acts with its output signal upon a device for the drafting of the fiber sliver or is used thereafter to monitor quality. The signal processor may thus produce a change in drafting at the precise instant when a different sliver thickness is present at the drafting point.

The pair of scanning rollers is designed so that a stationary, rotatable scanning roller is assigned opposite to the other rotatable and swivelling scanning roller. The two scanning rollers are pre-stressed by means of a spring. The swivelling scanning roller is swivelled out as a function of the thickness of the fiber sliver which is conveyed between the pair of scanning rollers. The angle of swivel is transformed into an electric signal, the measuring signal. As is known, a scanning roller pair is installed before a draw frame. A pair of scanning rollers is advantageously simple in mechanical structure, robust and therefore economical.

In the operation of the pair of scanning rollers, it may occur that the measuring signal is distorted. It is known that in a pair of scanning rollers operating as mechanical sensors, an influence is exerted upon the measuring signal by tolerances in the scanning rollers and tolerances of the scanning roller mountings. Deviations from the ideal geometry of a scanning roller body may manifest themselves in diameter differences over the length of the cylindrical body of the scanning roller. Similarly, deviations from a centered mounting of the scanning rollers also lead to eccentricity. The tolerances in the geometric dimensions of the scanning rollers are superimposed on the tolerances of the mounting of the scanning rollers. These tolerances then lead to an error in the measuring signal that must not be underestimated. It is a periodic error which manifests itself with every revolution of a scanning roller.

In the state of the art the deviations have been accepted in the past, and the utilization of the scanning rollers in measuring the fiber sliver thickness was therefore limited to applications where the influence of errors appeared to be acceptable. Although it is reliable and robust in practical use, it was not possible, for the above-mentioned reasons, to use the scanning roller in general application to measure the fiber sliver thickness on pre-spinning machines.

If a pair of scanning rollers is used as a measuring element only in order to determine the long-term fluctuations of the fiber sliver, the consequences of these errors remain comparatively minor ones. The error is also a minor one if the fiber sliver thickness to be measured is relatively great. This is the case, for example, with a doubled fiber sliver before it is drafted in the draw frame.

When a scanning roller is used in determining measuring signals for the control of brief fluctuations of a relatively thin fiber sliver, the above-described error has, however, aggravating consequences. This would be the case where the scanning roller would be used to measure at the output of a pre-spinning machine. EP 176 661 describes a possible application variant for the utilization of measuring signals obtained at the output of a process to control pre-spinning machines. However, no solution is offered for the avoidance of errors in the measuring signals produced by circularity error and/or eccentricity.

Brief fluctuations of the fiber sliver thickness occur within a range of fiber sliver lengths that is shorter than the circumference of a scanning roller. From this it clearly appears that periodically occurring errors due to circularity error and/or eccentricity of the scanning roller may have an enormous effect on the measuring signal.

This error influence increases as the thickness of the fiber sliver to be measured decreases. This explains why the measuring of tolerances and/or eccentricity becomes relevant beyond a certain ratio of the mean distance of the two scanning rollers.

According to the present state of the art, these errors can only be reduced by subjecting the scanning rollers to a costly manufacturing and testing process. To further reduce the known errors even slightly would lead to disproportionate expenditures. For this reason scanning rollers are not used at the output of pre-spinning machines to measure brief fluctuations of the fiber sliver thickness.

OBJECTS AND SUMMARY OF THE INVENTION

It is a principal object of the instant invention to determine and to correct the error produced by circularity error and/or eccentricity of a pair of scanning rollers in the measuring signal obtained by means of the pair of scanning rollers of a pre-spinning machine in order to measure the thickness of fiber fleece or fiber sliver. Additional objects and advantages of the invention will be set forth in part in the following description, or may be obvious from the description, or may be learned through practice of the invention.

The measuring errors are compensated for electronically after correction according to the present inventive process.

The scanning roller is coupled to a digital angle-of-rotation generator which determines the acceptance of measuring signals for defined angular positions of a revolution. The scanning roller rotates at a known speed. During one revolution of the scanning roller no or only minimal changes in speed occur. The thickness signal produced by the pair of scanning rollers is converted by a signal converter into an electrical measuring signal and is then digitalized. A defined number of measuring signals is thereby produced for one revolution, i.e. the scanning rate for one interval is constant. In this case the interval is based on one revolution of the scanning rollers. Several intervals constitute one cycle. Scanning is here synchronized with predetermined angular positions of the scanning rollers at equal distances. The mean value of an interval is determined for many cycles of rotations. It is assumed that the measuring signals for fiber sliver thickness correspond to a statistical normal distribution with respect to their mean value, i.e. that the measuring signals for fiber thickness are distributed symmetrically around their mean value. They are thus statistically independent of circularity error and/or eccentricity of the pair of scanning rollers. The measuring signals of an interval determined over many cycles give a picture of the error value. It is to be assumed here that only those portions of measuring signals which are in synchronization with the revolution do not assume the value zero when a message is transmitted.

The error values which can be derived from the mean value set of the measuring signals are related to position, i.e. they are stored as related to time or angle of rotation. A so-called "pre-image" of the pair of scanning rollers is produced for one interval. As the scanning rollers are put in operation, the position-synchronous error values are then called up from the memory by the current, position-related measuring signals. Depending on the character of the circularity error (rise or depression on the scanning roller) the position-synchronous error value must be added to the current measuring signal or must be subtracted from same. The measuring signal is thus corrected by the error of the circularity error and/or the eccentricity. The corrected measuring signal is made available for further utilization to a signal processor. This signal processor is able to edit the corrected measuring signal to monitor the fiber sliver thickness, i.e. for the acquisition of quality data, or else the signal processor is also able to edit the corrected measuring signal in order to influence drafting.

The precision of the correction of the measuring signal depends on the type of position determination and on the number of mean intervals between measuring signals.

This correction of the measuring error even before further processing of the measuring signal in other signal processors makes it possible to use the mechanical scanning rollers as measuring elements in order to determine the fiber sliver thickness at the output of a pre-spinning machine, i.e. for short-wave thickness measurement of a drafted fiber sliver.

BRIEF DESCRIPTION OF THE DRAWINGS

FIG. 1 shows the structure of a pair of scanning rollers;

FIG. 2 shows an ideal pair of scanning rollers;

FIG. 2a shows a pair of scanning rollers with circularity error;

FIG. 2b shows a pair of scanning roller with eccentricity;

DETAILED DESCRIPTION OF THE PREFERRED EMBODIMENTS

Figure 3:
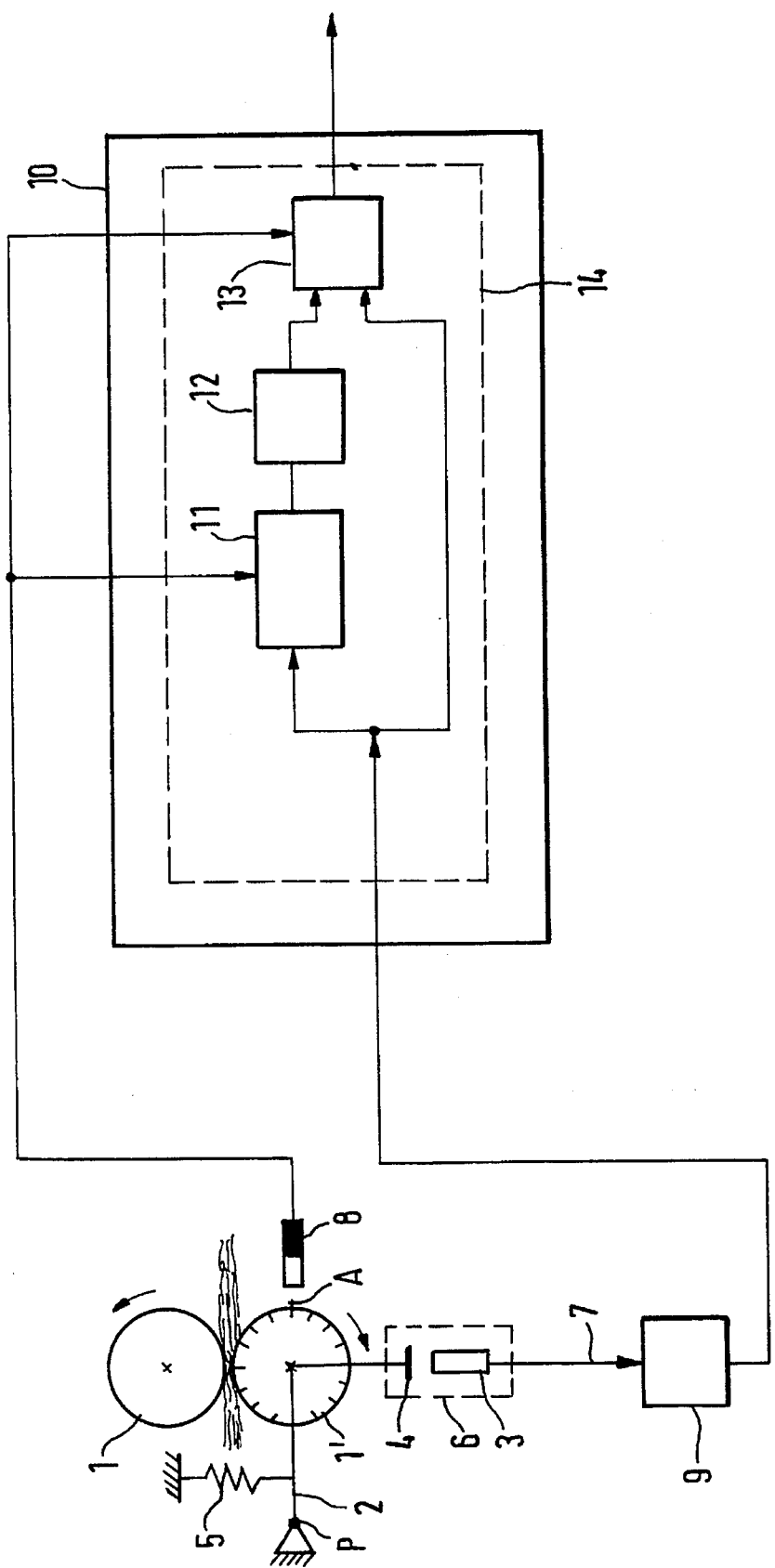
FIG. 3 shows an arrangement for the correction of the circularity error and/or of the eccentricity.

Reference will now be made in detail to the presently preferred embodiments of the invention, one or more examples of which are illustrated in the accompanying drawings. Each example is provided by way of explanation of the invention, and not as a limitation of the invention. It will be apparent to those skilled in the art that various modifications and variations can be made in the invention without departing from the scope or spirit of the invention.

Additionally, the numbering components in the drawings and description is consistent throughout, with the same components having the same number.

FIG. 1 shows a pair of scanning rollers 1, 1' in the process of measuring the thickness of a fiber sliver FB. Such an application is possible on a draw frame. The pair of scanning rollers can be used in addition also to measure the thickness of a fiber fleece on a carding machine. For the purpose of explaining the basic functioning of the invention, the following description of sliver thickness measurement is carried out on a draw frame.

The scanning roller 1 is fixed in its position but is mounted rotatably. The scanning roller 1' is mounted rotatably and can be swivelled on a swivelling arm 2. The swivelling arm 2 can be swivelled around swivelling point P. The two scanning rollers constituting a pair of scanning rollers 1, 1' are stressed by a spring 5. A fiber sliver FB is conveyed between the pair of scanning rollers 1, 1'. The scanning roller 1' swivels out as a function of the thickness of the fiber sliver. The scanning roller 1' is connected to a target 4 of an electrical signal former 6. The distance between target 4 and the fixed proximity sensor 3 varies as a function of the fluctuations in thickness of the fiber sliver. An electrical measuring signal 7 is formed in the proximity sensor 3 as a function of the proximity of the target 4. If the pair of scanning rollers possessed the idealized geometry and centricity as shown in FIG. 2, no measuring error would be produced by circularity error or eccentricity. FIG. 2a shows possible circularity error U1 (representing a depression) and U2 (representing a rise) on the scanning roller 1. Circularity errors may assume many different aspects. A circularity error may occur on the scanning roller 1 or on the scanning roller 1' or on both.

FIG. 2b shows a typical eccentricity E between scanning roller 1 and scanning roller 1'. These eccentricity errors, alone or in combinations with circularity errors result in a distortion of the electrical measuring signal 7 produced.

In the device according to FIG. 3 the scanning roller 1' is provided with an angle-of-rotation generator. One revolution, e.g. in relation to position A, supplies a defined number of position impulses of scanning roller 1'. Since scanning rollers 1 and 1' run in synchronization with each other (belt or gear coupling), this also applies to the pair of scanning rollers. One revolution corresponds to one interval. Measuring signals are scanned via proximity sensor 3 in allocation to the obtained position signals. The measuring signals are therefore scanned in synchronization with the position settings of the pair of scanning rollers which are to be defined. The measuring signals obtained in the electrical signal former 6 are digitalized by an analog/digital converter 9.

A constant number of measuring signals is obtained for each revolution of the scanning roller. These are the measuring signals for one interval. Electronic system 10 derives a mean value set of the measuring signals for one interval from a plurality of cycles of rotation.

Figure 4:
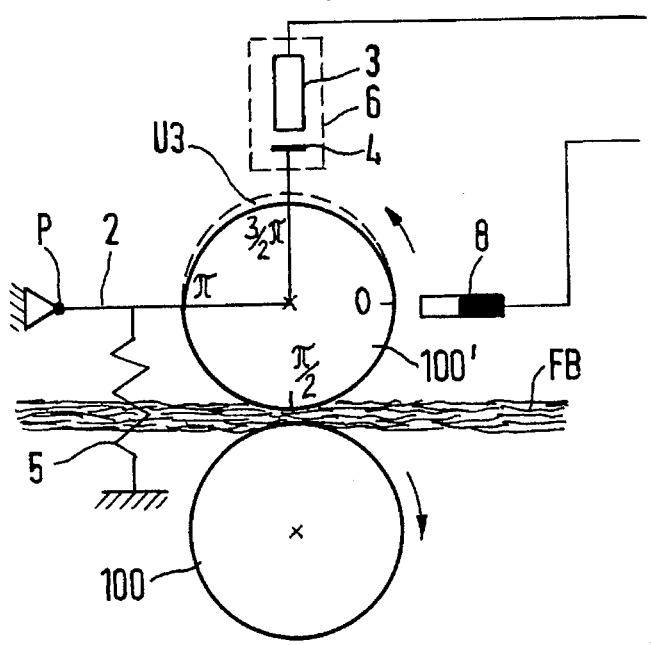
FIG. 4 shows a pair of scanning rollers with circularity error of a depression within an angle of rotation range $\pi$ to $2\pi$.
Figure 5:
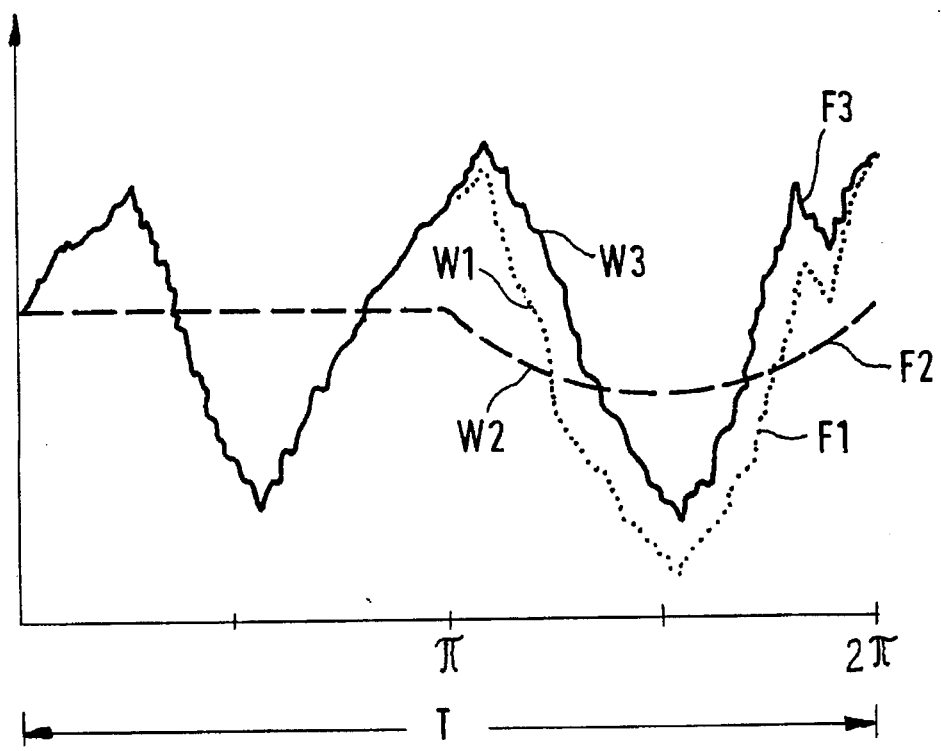
FIG. 5 is a graphic representation of the principle of correction of the measuring error.

The electronic system 10 is equipped with modules for the formation of mean values. The core of the electronic system 10 is a microprocessor 14 which includes a mean value former 11, a memory 12, and a correction element 13. The set of values of the measuring signals averaged over many cycles of rotation yields a representation of the error value which is caused by the circularity error and/or eccentricity of the scanning rollers. FIG. 4 shows for instance a circularity error U3 which, in relation to a revolution of the pair of scanning rollers 100, 100' acts as a depression within the angle-of-rotation range $\pi$ to $2\pi$. In case of circularity error and/or eccentricity, an error is involved which influences the measuring signal periodically. The measuring signals pertaining to the fiber sliver thickness are distributed symmetrically around their mean value, i.e. they represent a statistically normal distribution. This situation as related to FIG. 4 is documented by FIG. 5. The pair of scanning rollers 100, 100' rotates in the direction of rotation indicated (arrow). The thickness of a fiber sliver FB is represented as function F1 over an interval T (0 to $2\pi$). Periodic errors such as circularity errors and/or eccentricity can be found by means of a mean value set for one interval. In FIG. 5 the function F2 shows a value set of the measuring signals averaged after many cycles of rotation. This represents a mean signal value. Function F2 reflects the corresponding error values in segment $\pi$ to $2\pi$ of the interval T such as result from the arrangement of FIG. 4. This mean value set of the measuring signals for one interval is stored in a memory. It is a "pre-image" of a revolution of the pair of scanning rollers 100, 100'. The determination of such a "pre-image" is an important pre-condition. This so-called pre-image must be found as a unicum at a selected point in time and must be used as the basis for subsequent application of the process. In FIG. 5, function F2 shows position-related error values of different magnitudes within the angle-of-rotation range $\pi$ to $2\pi$.

As the pair of scanning rollers 100, 100' is operated, current position-synchronous measuring signals are supplied by the signal former 6. The angle-of-rotation generator 8 exerts control with its digital impulses via electronic system 10 so that measuring signals 7 are scanned and determined for synchronous angle positions. These measuring signals 7 are digitalized by means of the analog/digital converter 9.

As explained earlier, a mean value set for an interval T is derived from a plurality of cycles of rotation. This process is carried out by means of a mean-value former 11 which derives the corresponding error values according to their phase position as being deviations from the mean signal value.

Those current measuring signals which can be attributed in a position-synchronous manner to a stored error value are corrected by the error value in a correction element 13. That this correction becomes possible and that the error value is made available from a memory 12 in relation to position is due to the control carried out by the angle-of-rotation generator 8. The correction in the example of FIG. 5 is effected by adding the error value to the corresponding position-synchronous, current measuring signal 7. The result of a correction is shown by function F3 in FIG. 5. The position-related error value W2 is for example added to the current, position-synchronous measuring signal W1 and the result is the corrected measuring signal W3.

In case of a circularity error U2 for example, the found error value would have to be subtracted.

The error due to circularity error and/or eccentricity is thus corrected before any further processing. The precision of the correction depends on the type of position determination and of the number of cycles of rotation used to determine a mean value set.

In order to render the process independent of long-term thickness changes (long-term numbers fluctuations), i.e. in order to bring out the periodic error values more clearly, the long-term share of fluctuations relative to the fiber thickness should be eliminated. This is the so-called DC share or direct current share of a fluctuation relative to the fiber sliver thickness. This DC share would have to be subtracted from the mean value set of the measuring signals relative to position.

In order to further automate the process, it can be carried out in a self-learning manner. For this it would be necessary to average measuring signals from several cycles of rotation by means of a revolving mean-value filter. In this manner the precision of the corrected output signal can be increased with each revolution.

Furthermore it is also possible to detect a slow, mechanical wear of the scanning rollers and to correct it during operation. This is possible by producing a new "pre-image" of the mean value set at time intervals to be defined and by comparing it with the previous pre-image. Changes would represent mechanical wear.

The described process furthermore has the advantage that it has fewer intermediate steps and therefore operates at a higher processing speed while being more economical in its implementation.

To find the error value, a correlation process would in principle also be possible. Using an auto-correlation, the measuring signal 7 could be evaluated, i.e. the periodicity of a circularity error for example, is found for an interval T. An electronic correlator which produces a time shift of the found curve relative to the fiber thickness in accordance with the auto-correlation definition is used for this, in order to find a squared mean value of the measuring signals. The found periodicities represent error values. These error values must also be used for position-synchronous correction of the current measuring signals.

It will be apparent to those skilled in the art that various modifications and variations can be made in the present invention without departing from the scope or spirit of the invention. For example, features illustrated or described as part of one embodiment may be used with another embodiment to yield a still further embodiment. It is intended that the present invention cover such modifications and variations as come within the scope of the appended claims and their equivalents.

We claim:

1. A process for measuring changes in thickness of a textile fiber sliver conveyed through a textile machine, said process comprising:

conveying the textile fiber silver between a pair of scanning rollers rotatably mounted on the textile machine wherein one of the scanning rollers is movably mounted and moves in response to changes in sliver thickness;

detecting movement of the movable roller and generating an actual electrical measuring signal corresponding thereto;

repeatedly generating a constant number of phase position dependent measuring signals for one revolution of the scanning rollers while maintaining the scanning rollers at a relatively constant speed and defining therefrom a mean value set of phase position dependent measuring signals, the set of phase position dependent measuring signals reflecting the occurrence of repetitive periodic deviations in the measuring signal caused by circularity or eccentricity errors in the scanning rollers;

storing the mean value set of phase position dependent measuring signals;

comparing the actual measuring signal from the scanning rollers to the stored mean value set of phase position dependent measuring signals and defining a phase dependent error signal corresponding to differences therebetween;

applying the phase dependent error signal to the actual measuring signal in phase position synchronization therewith thereby defining an actual measuring signal corrected for circularity or eccentricity errors; and conveying the corrected measuring signal to a signal processor for further processing by the textile machine.

2. The process as in claim 1, further comprising scanning and digitizing the actual measuring signal at phase dependent synchronization with the mean value set of phase position dependent measuring signals.

3. The process as in claim 2, comprising controlling said scanning and digitizing with an angle of rotation generator device operably configured with said scanning rollers.

4. The process as in claim 1, comprising sensing the changes of thickness in a fiber sliver in a textile drawframe to control drafting of the fiber sliver in response to such changes in thickness.

5. The process as in claim 1, further comprising periodically updating the stored set of mean value phase position dependent measuring signals.

6. An apparatus for correcting a fiber sliver thickness measuring signal for errors in eccentricity or circularity of scanning rollers, said apparatus comprising:

a pair of rotatable scanning rollers, one of said rollers being mounted so as to move in response to changes in sliver thickness of a fiber sliver conveyed between said rollers;

a measuring signal former in communication with said movably mounted roller and generating a measuring signal indicating silver thickness in response to motion of said movably mounted roller;

an angle or rotation generator device configured with said scanning rollers and supplying a defined number of phase position impulses of said scanning rollers per revolution of said scanning rollers, said measuring signal former generating a measuring signal for each said position impulse;

an electronic control system in communication with said measuring signal former and said angle of rotation generator device and configured to compute a mean value set of phase dependent measuring signals from said measuring signals generated for each phase position impulse, said electronic control system generating an error value signal from deviations between current measuring signals and said mean value set of measuring signals and applying said error value signal in a phase position synchronous manner to current measuring signals to correct for eccentricity or circularity errors in said scanning rollers.

7. The apparatus as in claim 6, wherein said angle of rotation generator device controls the scanning rate of said measuring signal former via said electronic control system.

8. The apparatus as in claim 6, wherein said electronic control system comprises a correction element for applying the error value signal to current measuring signals in a phase synchronous manner.

9. The apparatus as in claim 8, wherein said electronic control system comprises a microprocessor, said microprocessor comprising said correction element, a memory for storing the error value signal, and a mean value former for generating the mean value set of measuring signals.

* * * * *